(12) United States Patent
Groche et al.

(10) Patent No.: US 12,313,485 B2
(45) Date of Patent: May 27, 2025

(54) COMPONENT WITH AN INTEGRATED SENSOR DEVICE FOR AN OPTICAL, MULTI-AXIAL MEASUREMENT OF A FORCE APPLICATION

(71) Applicant: Technische Universität Darmstadt, Darmstadt (DE)

(72) Inventors: Peter Groche, Mühltal (DE); Nassr Al-Baradoni, Darmstadt (DE)

(73) Assignee: Technische Universität Darmstadt, Darmstadt (DE)

(*) Notice: Subject to any disclaimer, the term of this patent is extended or adjusted under 35 U.S.C. 154(b) by 241 days.

(21) Appl. No.: 18/015,337

(22) PCT Filed: Jul. 29, 2021

(86) PCT No.: PCT/EP2021/071303
§ 371 (c)(1),
(2) Date: Jan. 10, 2023

(87) PCT Pub. No.: WO2022/023480
PCT Pub. Date: Feb. 3, 2022

(65) Prior Publication Data
US 2023/0296460 A1 Sep. 21, 2023

(30) Foreign Application Priority Data
Jul. 30, 2020 (DE) ............. 10 2020 120 192.3

(51) Int. Cl.
*G01L 5/166* (2020.01)
*G01L 3/12* (2006.01)

(52) U.S. Cl.
CPC ............. *G01L 5/166* (2013.01); *G01L 3/12* (2013.01)

(58) Field of Classification Search
CPC . G01L 5/166; G01L 3/12; G01L 1/241; G01L 3/1421; G01L 5/24; G01L 1/24
See application file for complete search history.

(56) References Cited

U.S. PATENT DOCUMENTS 7,474,296 B2 * 1/2009 Obermeyer ............. G06F 3/016
345/166
8,816,962 B2 * 8/2014 Obermeyer ........ G05G 9/04737
345/161
(Continued)

FOREIGN PATENT DOCUMENTS

DE 4132110 A1 4/1993
DE 102012005614 A1 9/2013
(Continued)

*Primary Examiner* — Freddie Kirkland, III
(74) *Attorney, Agent, or Firm* — Smartpat PLC (57) ABSTRACT

A component has an integrated sensor device for an optical, multi-axis measurement of a force applied to the component. The component includes a cavity and a first support element having one or more first optical elements and a second support element having one or more second optical elements. The first support element and the second support element are formed in the cavity and partially inserted into the component. A transmission device generates at least two beams in independent directions when connected to a power source. The beams pass through the cavity between the first optical elements and the second optical elements. The first optical elements and the second optical elements are adapted to generate information about a relative positional change of the first support element with respect to the second support element based on the at least two beams. The transmission device provides the information for measuring the force application.

13 Claims, 6 Drawing Sheets

(56) References Cited

U.S. PATENT DOCUMENTS

| | | | |
|---|---|---|---|
| 9,249,820 B2* | 2/2016 | Groche | B23P 11/025 |
| 9,513,178 B2* | 12/2016 | Tar | G01L 5/166 |
| 10,274,386 B2* | 4/2019 | Shafer | B25J 13/085 |
| 10,466,120 B2* | 11/2019 | Groche | G01L 1/2225 |
| 10,732,061 B2* | 8/2020 | Reich | G01L 5/009 |
| 2013/0265233 A1 | 10/2013 | Obermeyer et al. | |
| 2014/0326882 A1 | 11/2014 | Tar et al. | |
| 2015/0030408 A1 | 1/2015 | Groche et al. | |
| 2018/0128697 A1 | 5/2018 | Groche et al. | |
| 2019/0072443 A1 | 3/2019 | Reich et al. | |
| 2020/0041340 A1* | 2/2020 | Schade | G01J 3/0232 |

FOREIGN PATENT DOCUMENTS

| | | |
|---|---|---|
| DE | 102017101580 A1 | 7/2018 |
| WO | 2013072712 A1 | 5/2013 |
| WO | 2016177356 A1 | 11/2016 |

* cited by examiner

COMPONENT WITH AN INTEGRATED SENSOR DEVICE FOR AN OPTICAL, MULTI-AXIAL MEASUREMENT OF A FORCE APPLICATION

TECHNICAL FIELD

The present disclosure relates to a component with an integrated sensor device for an optical, multi-axial measurement of a force action on the component, a method for manufacturing such a component with an integrated sensor device, and in particular to a structure-integrated optical multi-axial force/torque measurement.

BACKGROUND

Sensor devices that are integrated into a component are known for measuring the effect of a force on a component or part of a structure. For example, patent DE 10 2012 005 614 B4 discloses a support structure with a sensor unit integrated in a cavity in the form of a connecting element with integrated sensor technology. The sensor system comprises piezo actuators or strain gauges for detecting loads and their effective direction. Strain gauges or piezoelectric transducers are also used, for example, in a sensor unit disclosed in WO 2016 177 356 A1 and integrated in a hollow shaft to determine a mechanical load on the hollow shaft. In addition, sensor devices are also known that are based on optical devices and detect forces in multiple axes. For example, document WO 2013 072 712 A1 shows a light source arranged on a support element under a hemispherical cover layer, as well as a light detector, which are designed to determine a deformation of the cover layer due to a light reflection on the same. Furthermore, sensor units based on interferometry are known, such as the interferometer from DE 41 32 110 A1, which is embedded in an elastically deformable body.

Disadvantages of the integrated sensors in the state of the art are the high costs and the complex production of the measuring chain for multi-axial measurement by strain gauge and piezo-based designs. For optical multi-axis force sensors, the large deformation required of the sensor bodies is a hindrance. In the case of force sensors with interferometer, a disadvantage up to now has been the sensitivity to interference during assembly.

There is thus a need for components with cost- and production-efficient integrated optical measuring sensors, which are designed to measure loads on the components due to the effects of forces from external forces or torques in several spatial axes or directions.

SUMMARY

This objective is at least partially achieved by a component with an integrated sensor device as well as by a method for manufacturing such a component with an integrated sensor device as disclosed herein.

The present disclosure relates to a component with an integrated sensor device for an optical, multi-axial measurement of a force application (a force or a torque) on the component. In this regard, the component comprises a cavity in which a first support element having one or more first optical elements and a second support element having one or more second optical elements are formed and partially inserted into the component. The parts of the first and second supporting elements that are inserted into a material of the component fix the supporting elements to the component. The supporting elements can be fixed, for example, by soldering, gluing, welding or screw connection; however, these joining methods are not sufficiently secure and are only suitable to a limited extent for the high requirements of the sensor device for a precise, play-free and long-term stable connection to the component. Advantageously, the fixing of the supporting elements is carried out via cold solid recasting or cold forming of the supporting elements and/or the component. Furthermore, the component includes a transmission device which is designed to be connected to an energy source and to transmit or generate at least two beams in mutually independent directions when connected to the energy source, the beams passing through the cavity between the first optical elements and the second optical elements, respectively. Thereby, the first optical elements and the second optical elements are configured to generate information about a relative position change of the first support element with respect to the second support element based on the at least two beams. The transmission device is further configured to provide the information for measuring the force application, or to transmit the information out of the component.

A relative change in position between the first and second support elements occurs due to the joining of the first and second support elements to the component when an external force or torque acts on the component and deforms it due to elasticity of the component. Advantageously, the two beams are part of a beam path which is suitable for ensuring information about the change in position even in the case of small deformations of the component due to an external force. The independent directions of the at least two beams allow measurement of the change in position or the application of force with respect to several axes or directions. The first and second optical elements may be configured to superimpose the at least two beams into a collected beam, and the transmission device may be configured to transmit the collected beam out of the structure. For example, pixel-based detection of a displacement, such as a digital image correlation or digital moiré method, may be used to generate the information. Alternatively or additionally, at least one of the beams may pass between partially reflective plates (or semi-transparent mirrors) to form a Fabry-Pérot interferometer. Furthermore, at least one of the beams may also be part of a beam path of a Michelson interferometer.

Optionally, the transmission device is designed to be connected to a light source as an energy source. The light source may in particular be a laser device. The connection may be implemented as coupling a laser beam into a light guide, such as a fiber optic cable, which is configured to bring the laser beam to the first and/or the second optical elements to create a beam path between the optical elements that includes the at least two beams. However, the transmission device may also be configured to be connected to a current source as a power source. In this case, a power cable may direct power to one or more of the first and/or second optical elements configured to generate a beam path comprising the at least two beams. The transmission device may further be configured to transmit information about the relative position change of the first support element with respect to the second support element out of the component through a light guide. Again, a fiber optic cable may be provided for this purpose. However, the transmission device may also be designed to transmit the information out of the component through an electrical line. For this purpose, for example, a superposition of the beams can be converted by optical elements such as diodes, semiconductor components or cameras into an electrical signal that transmits the information through the electrical line.

Optionally, the component is one of the following: a hollow shaft, a hollow cylindrical component, a tube (pipe), a robotic element (in particular a robotic arm), an element intended for a structure, a crane or load arm, a connecting element, a column of a machine tool, a tool, a tool holder.

Optionally, the first optical elements and/or the second optical elements comprise an optical pattern and are configured to superimpose the at least two beams such that the information includes a change to a detected optical image of the optical pattern. In particular, the change of the optical image of this pattern may be due to a shift of the optical pattern. For example, masks may be provided in the path of the two beams, each of which comprises apertures as an optical pattern, so that the beams transmit an image of the optical pattern. The change of the image then results, for example, from a relative displacement and/or rotation of the apertures, triggered by the relative change in position of the supporting elements. In particular, the change of the image can be determined from the superimposed beams by a pixel-based method. The pixel-based method can be, for example, a digital image correlation or a method in which a displacement of a moiré pattern is measured.

Optionally, the first optical elements and the second optical elements form a Michelson interferometer for at least one of the at least two beams. This leads to a Michelson interference pattern which is used to generate the relative position change information, or which represents this information.

Optionally, at least one first optical element and at least one second optical element each comprise a partially reflective plate and are configured to form a Fabry-Pérot interferometer for at least one of the at least two beams.

Optionally, at least one additional supporting element having one or more additional optical elements is formed in the cavity and is partially inserted into the component so that the at least one additional supporting element is included in the beam path accordingly and the information can also be used to infer a relative position change with respect to the additional supporting element(s).

Embodiments further relate to a method for manufacturing a component with an integrated sensor device for an optical, multi-axial measurement of a force application on the component. The component includes a cavity, a first support element having first optical elements, and at least one further support element having further optical elements. The method includes the steps of providing an initial component having an initial cavity; positioning the first support element and the at least one further support element in the initial cavity of the initial component; forming the initial component so as to form the component and the cavity; and thereby plastically joining the first support element and the at least one further support element so as to fix the first support element and the second support element in the cavity.

Within the framework of conventional joining processes for fixing the supporting elements, these could also be fixed, for example, by soldering, gluing, welding or by a screw connection. However, if the sensor device places high demands on a precise, backlash-free and/or long-term stable connection to the component, these joining methods may prove to be unsafe. The forming process shown here as a preferred embodiment can be, in particular, cold solid recasting or cold forming. The forming fixes the first and the at least one further supporting element to the boundary of the cavity. In particular, the following two embodiments of the process can be used for this purpose.

In a first embodiment, at least one of the supporting elements includes a core made of very hard material and comprises an edge region that includes a material that is easier to deform compared to the material of the core. The more easily deformable material is plastically deformed by forming the component so that the at least one support element is fixed in the resulting cavity.

In a second embodiment, at least one of the supporting elements comprises a very hard material compared to a material of the initial component, so that during recasting the initial component is plastically deformed by the hard material of the at least one supporting element. The supporting element is thus fixed in the cavity of the component formed by the recasting.

Both embodiments can also be combined, i.e. different supporting elements can be fixed by different embodiments.

Advantageously, the first supporting element can be inserted first before the at least one further supporting element is positioned. For improved positioning or improvement of a position of the supporting elements, the sensor device can be coupled in or operated during positioning and/or during recasting.

In addition, embodiments also relate to methods of using the integrated sensor device for an optical, multi-axis measurement of a force application to a component comprising a cavity in which a first support element comprising one or more first optical elements and at least one second support element comprising one or more second or further optical elements are formed and partially inserted into the component, and further comprising a transmission device adapted to be connected to a power source. Such a method includes the steps of:

Generating, by the transmission device connected to the power source, at least two beams in independent directions, the beams passing through the cavity between the first optical elements and the second optical elements, respectively;

Generating, by the first optical elements and the second optical elements and based on the at least two beams, information about a relative position change of the first support element with respect to the second support element;

Transmit, through the transmission device, the information about the relative position change, so as to measure the force application.

Thus, embodiments of the present component with integrated sensor device are characterized in that at least two supporting elements are fixed within an at least partially hollow structure of the component, on which optical elements such as optical fiber, mirror, light source, optical marker and camera are fixed. The optical elements are positioned relative to each other such that relative displacement or rotation of the support elements relative to each other causes, for example, a change to a pattern captured by an internal camera or an external camera connected via optical fiber. This change of the pattern can be traced back to the deformation present via image evaluation. In this context, embodiments realize different beam paths, each of which includes beams in different directions or in oblique planes. The supporting elements are advantageously integrated into the structure of the component by (partial) plastic joining. For this purpose, the supporting elements include, at least in one part in each case, a high-strength and rigid material to which the optical elements can also be attached. The strength or hardness of the material is greater than that of a cavity wall of the component structure, so that the supporting elements can be inserted by forming the component. For positioning or fixing and aligning the supporting elements in the structure during plastic joining, the supporting elements can each also comprise a softer material, in particular in an edge region, which ensures that the arrangement of the supporting elements is maintained in the recasting process. For example, a supporting element can comprise a very hard core region and an edge region that is easier to deform in comparison.

In this way, both interference-based and pixel-based optical measuring chains can be embedded in support structures by forming technology. The integrated sensors then consist of at least two parts which are inserted separately and with high precision to each other in the structure. The measuring axes can be extended by using mirrors and, for example, by inclining part of the beam path relative to a longitudinal axis of the support structure. For the pixel-based methods mentioned, a suitable pattern can be applied to a photomask or to a surface so that its relative displacement to another optical element (e.g., a camera) is recorded when the structure is loaded. By splitting the beam path (oblique pattern and mirror), a displacement of the pattern relative to the camera is translated into a relative position change between the supporting elements, and thus the force or torque application is recorded. Depending on the pattern, the evaluation in the pixel-based methods can be performed either by digital image correlation or by digital moiré methods (superposition of line patterns). These pixel-based methods can be used in particular to determine parallel displacements between two supporting elements in all six degrees of freedom. Distance displacements can also be measured. However, the sensor device can also be implemented in a similar way, for example, for a Fabry-Pérot and/or a Michelson interferometry method. Here, in addition to the parallel displacement, a change of a distance between the supporting elements can also be detected with the aid of an obliquely installed interferometer and a suitable beam guide (through mirrors). Combinations of different measurement methods for different beams are also possible.

In conventional sensor devices for detecting forces or torques on components, measuring chains based in particular on changes in electrical properties are largely standardized. However, in addition to the sensors themselves, they require further electrical elements such as charge amplifiers or bridge circuits. They also require the supply of electrical energy, and the effort involved increases considerably, especially when forces or torques are recorded with respect to several axes. In some conventional measurement chains, preloaded structures or sensor devices are also used, which can be disadvantageous in some applications.

In contrast, embodiments of the present invention offer the following advantages. The component with integrated sensor device extends the measurement axes by low-cost components (especially when pixel-based methods are used) and a suitable arrangement of the beam paths, furthermore by an integral design of optical elements and support structures. It also opens up a possibility for scaling the sensors, and thus for manufacturing sensory structures in small dimensions. The integral design is achieved in particular by plastic joining. This results in a compact structure of the component with integrated sensor device for multi-axial detection of forces and/or torques acting on the component. By using pixel-based methods in particular, a considerable cost saving can be achieved compared to conventional strain gauge and piezo-based sensors.

BRIEF DESCRIPTION OF THE DRAWINGS

The embodiments of the present invention will be better understood with reference to the following detailed description and accompanying drawings of the various embodiments, which, however, should not be construed as limiting the disclosure to the specific embodiments, but are for explanation and understanding only.

DETAILED DESCRIPTION

Figure 1:
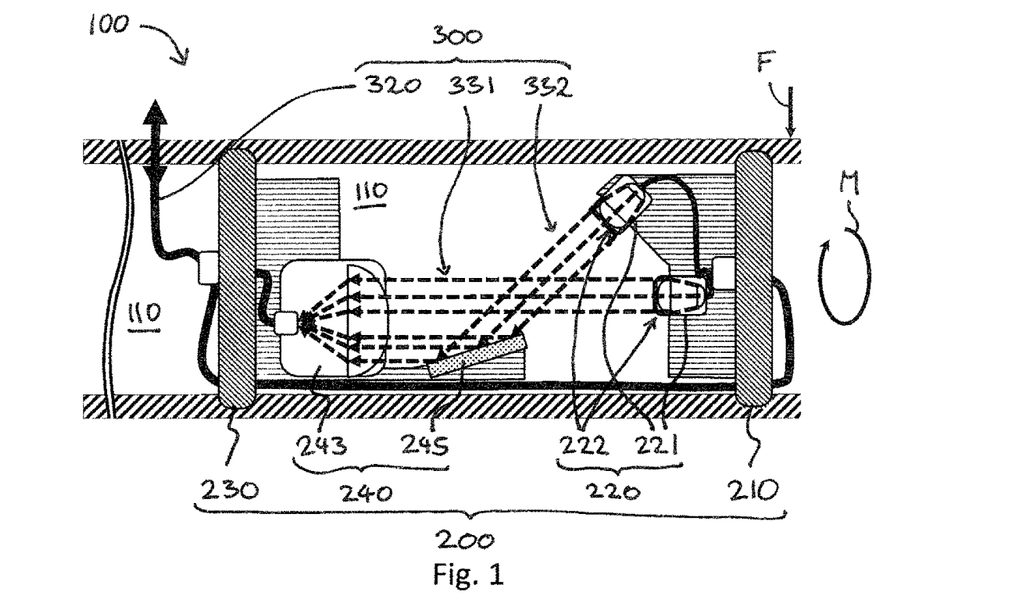
FIG. 1 illustrates an embodiment of the present invention for a component with integrated sensor device for a pixel-based process.

FIG. 1 illustrates an embodiment example of the present invention for a component 100 with an integrated sensor device 200 for an optical, multi-axial measurement of a force F and/or a torque M on the component 100. The component 100 comprises a cavity 110 with a wall 120. The sensor device 200 includes a first support element 210 having a plurality of first optical elements 220. In the illustrated embodiment, the first optical elements 220 include, in particular, two beam expanding elements 221 configured to expand light from an energy source supplied via a light guide and to guide the light into the cavity 110 as beams 331, 332, respectively, through an optical mask 222 and a photomask illuminated from behind. The sensor device 200 further includes a second support element 230 having a plurality of second optical elements 240. In the illustrated embodiment, the second optical elements 240 include, in particular, a mirror 245 and a beam collecting element 243 configured to collect or superimpose the two beams 331, 332 and to propagate them as a light signal through a line 320, in this case, such as a fiber optic cable. In this regard, the first supporting element 210 and the second supporting element 230 are formed in the cavity 110 and are partially inserted into the component 100. Further, the component 100 includes a transmission device 300 configured to be connected to an energy source, in this case for example a laser device, and to generate the two beams 331, 332 when connected to the energy source. In this regard, the two beams 331, 332 extend in mutually independent directions between the first optical elements 220 and the second optical elements 240 through the cavity 110. The first optical elements 220 and the second optical elements 240 are configured to generate information about a relative change in position of the first support element 210 with respect to the second support element 230 based on the two beams 331, 332. In the present example of an embodiment, this is done by superposition in the beam collecting element 243. The transmission device 300 is adapted to provide the information for measuring the force F and/or the torque M, or to transmit this information out of the component 100. Due to the independent directions of the beams 331, 332, the measurement is made with respect to a plurality of axes determined by the directions of the beams 331, 332 in the cavity 110: Due to the force F or the torque M, a position of the first support element 210 is displaced relative to a position of the second support element 230. As a result, a difference in the superposition of the two beams 331, 332 occurs in the beam collecting element 243, which is fed out of the component 100 as information via a line 320. Inference of the displacement, and thus measurement of the force F and/or torque M, is then possible, for example, by applying a known pixel-based method or by applying a known digital moiré method to the information.

In an embodiment similar to the one presented herein, the transmission device 300 may also be configured to supply a supply voltage to the optical elements 220, 240 or images out of the component 100 instead of light. Then, instead of or in addition to the beam expanding elements 221, light emitting diodes may be used to generate the beams (331, 332). The beam collecting element 243 may be designed as a camera. Also mixed forms of these embodiments (for example with a voltage supply of the first optical elements 220 and a light line for a transmission of the information, or vice versa) are possible.

Figure 2:
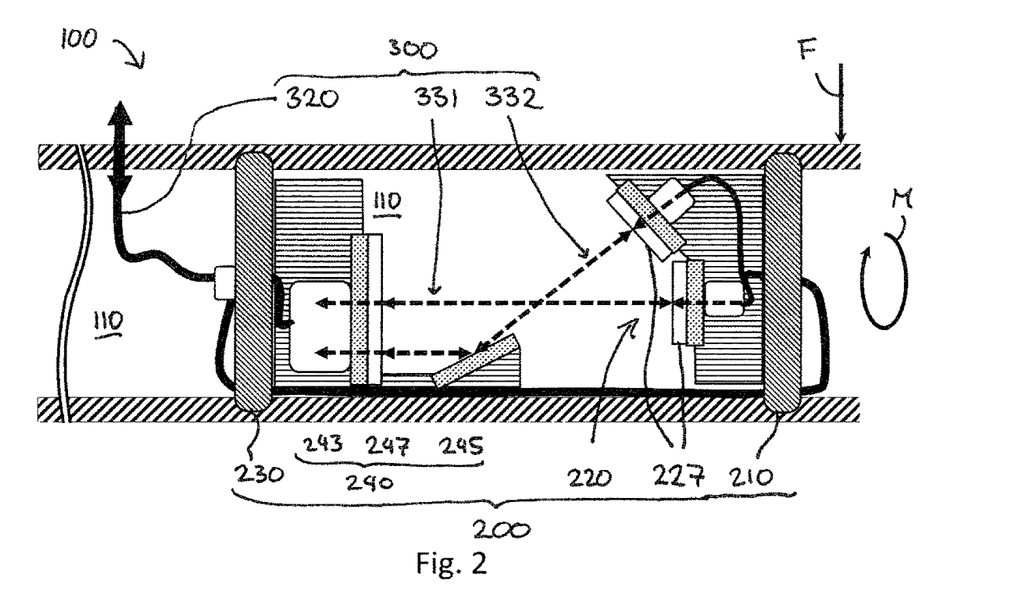
FIG. 2 illustrates another embodiment with a Fabry-Pérot sensor device.

FIG. 2 illustrates another embodiment of the component 100 with integrated sensor device 200. As in the embodiment illustrated in FIG. 1, the first optical elements 220 generate two beams 331, 332 in independent directions, include, however, a respective partially reflective plate 227 for each of the beams 331, 332. Another partially reflective plate 247 is located in front of a beam collection element 243 as part of the second optical elements 240. The partially reflective plates 227, 247 form a Fabry-Pérot interferometer or optical resonator for each of the two beams 331, 332. When the relative position of the supporting elements 210, 230 changes, a distance between the partially reflective plates 227, 247 changes and thus a resonance condition. For monochromatic beams 331, 332, this results in a change in an intensity of an optical or even electrical output signal generated by the beam collection element 227 and fed out of the component 100 via the line 320. If the beams 331,332 include multiple wavelengths, the change in resonance condition results in a color shift in the output signal. From the output signal, it is possible to infer the relative change in position of the supporting elements 210, 230 and thus the force F or torque M.

Figure 3:
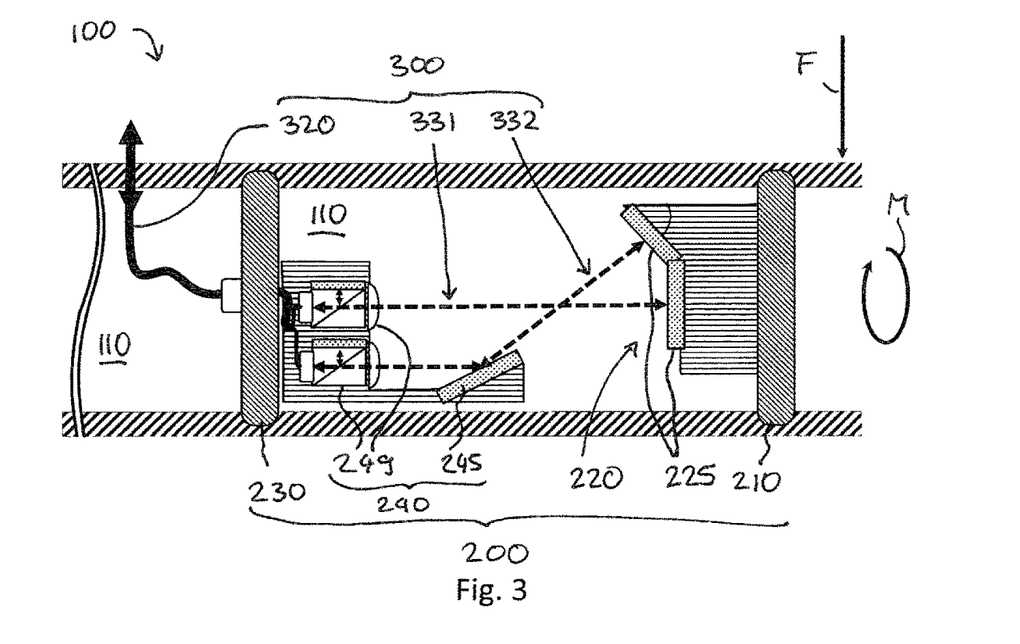
FIG. 3 illustrates another embodiment with a sensor device comprising a Michelson interferometer.

FIG. 3 illustrates another embodiment of component 100 with integrated sensor device 200. The embodiment includes a component 100 having a first support element 210 with first optical elements 220 and a second support element 230 with second optical elements 240, similar to the previous figures. Again, the beam path includes two beams 331, 332 between the first optical elements 220 and the second optical elements 240 in independent spatial directions. In this regard, the first and second optical elements 220, 240 are configured such that each of the beams 331, 332 is a respective part of a beam path of a Michelson interferometer. A relative positional shift between the first support element 210 and the second support element 230 results in a change in an interference formed in the interference elements 249. As in the preceding figures, this information is transmitted out of the component 100 as an output signal.

Figure 4:
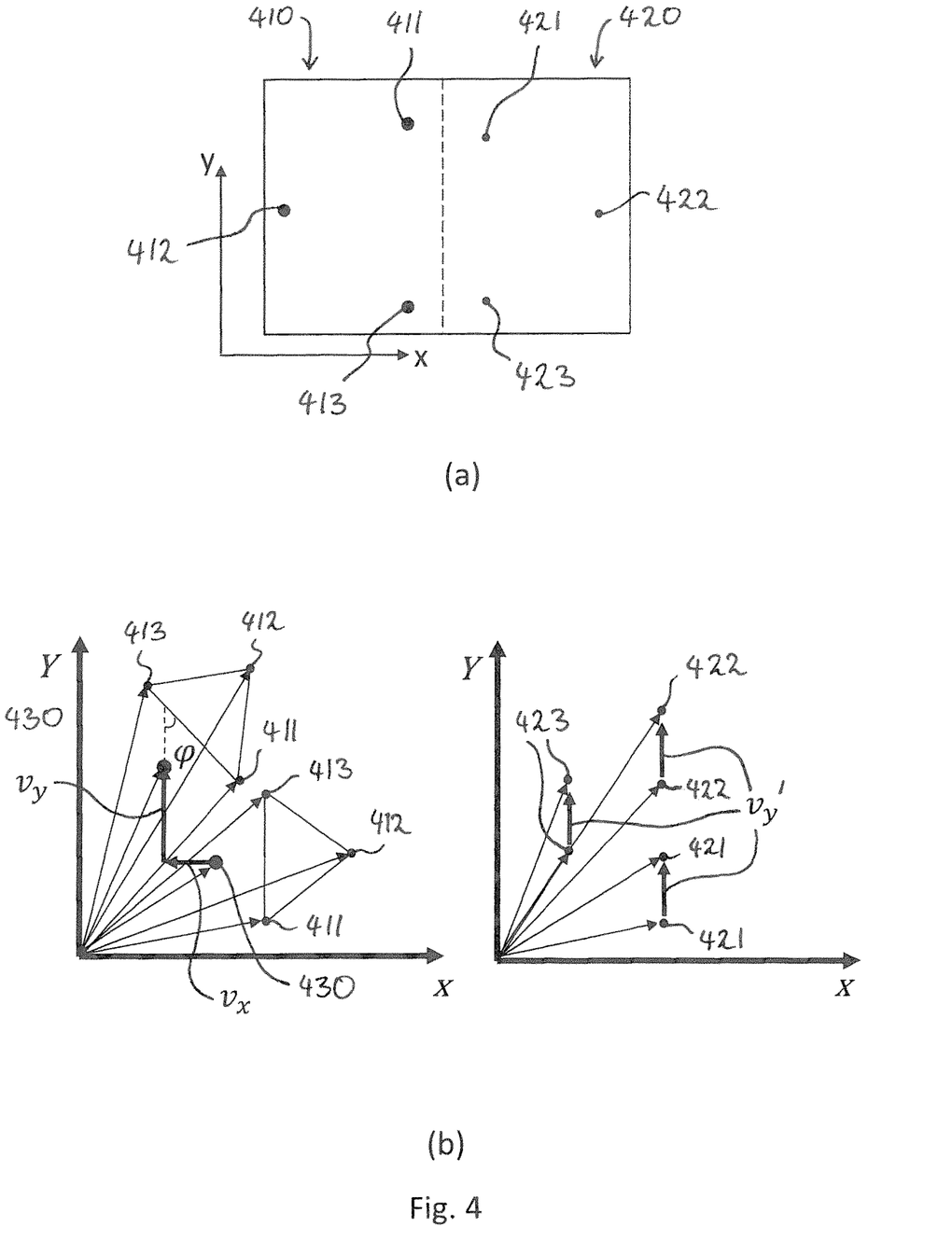
FIG. 4 illustrates a measurement by an embodiment example of FIG. 1 using digital image correlation.

FIG. 4 illustrates a measurement of a force application (a force F and a torque M) on the component 100 by determining a relative position change between the first support element 210 and the second support element 230 for an embodiment example according to FIG. 1. Here, a digital image correlation is used as a pixel-based method.

In part (a) of the figure, a first image 410 of an optical mask 222, caused in the beam collection element 243 by the first beam 331, and a second image 420 of a second optical mask 222, here for example identical to the first, caused in the beam collection element 243 by the second beam 332, are shown. For the present embodiment example, the images 410, 420 are thereby connected, in particular, by a reflection caused by the mirror 245. The points 411, 412, 423 in the first image represent light transmitting regions or calculation points in the optical mask 222. In this regard, they correspond to the calculation points 421, 423, 423 in the second image. A pixel-based method includes measuring positions of the calculation points 411-413, 421-423 in a forced state and in a non-forced state, and comparing the positions in the forced state with the positions in the non-forced state.

In part (b) of the figure, a displacement of positions of calculation points 411, 412, 413 from the unmirrored first beam 331 is shown on the left, as caused by the application of force. Thereby, from the displacement of the calculation points 421, 422, 423, in particular, a pivot point 430 can be determined, which reflects an attack position of the torque M. Based on a horizontal displacement $v_x$ of the pivot point 440, a magnitude of a horizontal force component of the force F acting on the component 100 can be determined. Based on a vertical displacement $v_y$ of the pivot point 430, a magnitude of a vertical force component of the force F acting on the component 100 can be determined. From an angle φ also results in a magnitude of the torque M.

Also shown in part (b) of the figure on the right is a displacement of positions of calculation points 421, 422, 423 from the mirrored first beam 332 that results after subtracting a displacement of calculation points 411, 412, 413 shown on the left in part (b). Based on the resulting displacement $v'_y$, a magnitude of an axial force component of the force F acting on the component 100 can be determined in the present illustration.

Figure 5:
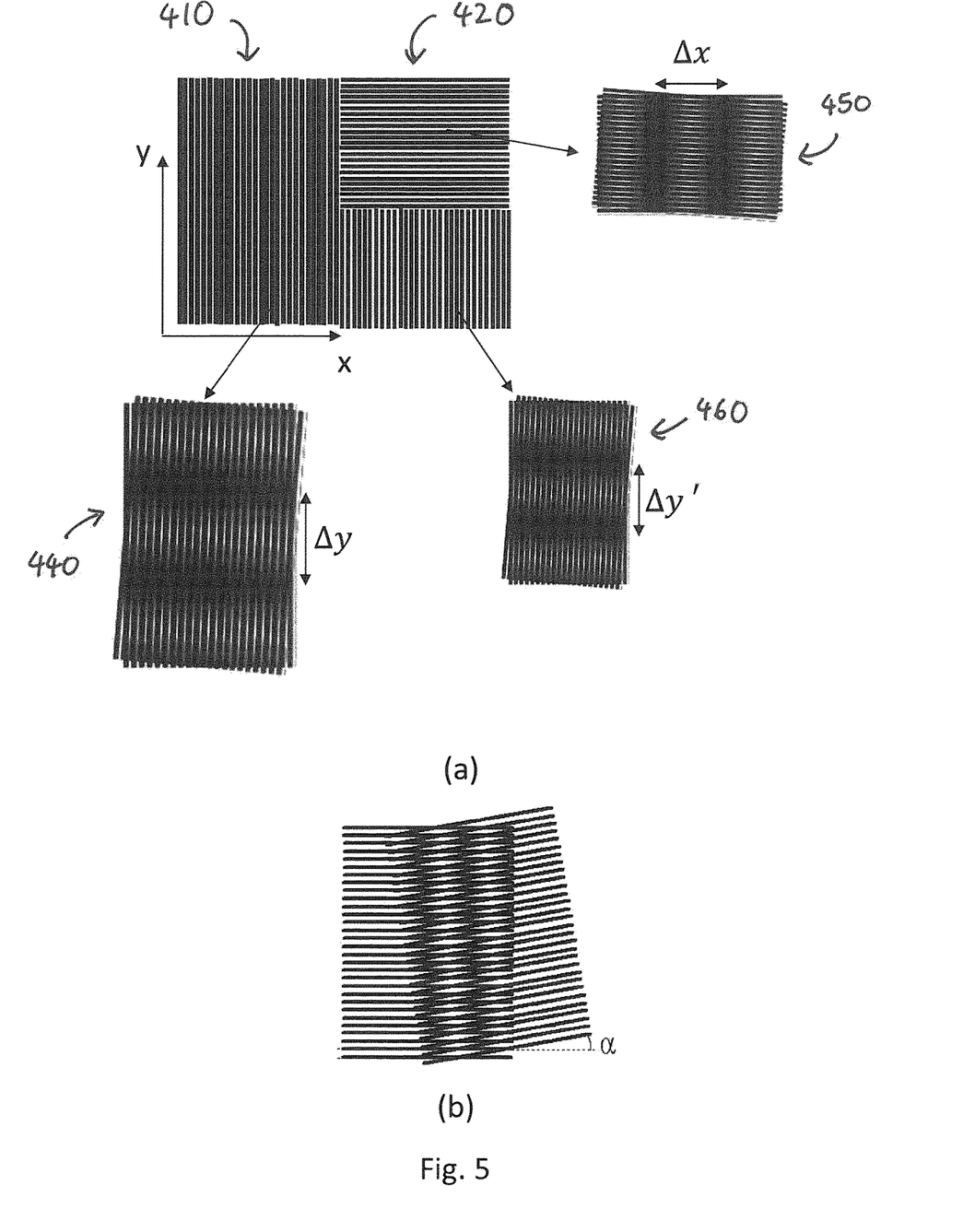
FIG. 5 illustrates a measurement by an execution example according to FIG. 1 using a digital moiré method.

FIG. 5 illustrates a measurement of a force application (a force F and a torque M) on the component 100 by determining a relative position change between the first support element 210 and the second support element 230 for an embodiment example according to FIG. 1. Here, a digital moiré method is used as a pixel-based method.

In part (a) of the figure, a first image 410 of an optical mask 222, evoked in the beam collection element 243 by the first beam 331, and a second image 420 of a second optical mask 222, evoked in the beam collection element 243 by the second beam 332, are shown. Here, the optical mask 222 each include periodic grating structures in different orientations. By recording the grating structures, their orientation can be compared without and with the application of force. This results in an overlay for the first image 410 that has a moiré pattern 440 of a first period Δy comprises. For the second image 420, there is correspondingly a moiré pattern 450, which has a second period Δx and a moiré pattern 460 that comprises a third period. Δy' comprises. Force components of the force F in a horizontal, vertical and axial direction can be determined from these periods.

In a part (b) of the figure, a moiré pattern is shown which is formed by a superposition of a lattice structure in a state in which no force is applied to the component 100 and a lattice structure in a state in which force is applied to the component 100. The lattice structures have an angle relative to each other α relative to each other. Based on the angle α it is possible to determine, for example, a magnitude of the strain moment M.

Figure 6:
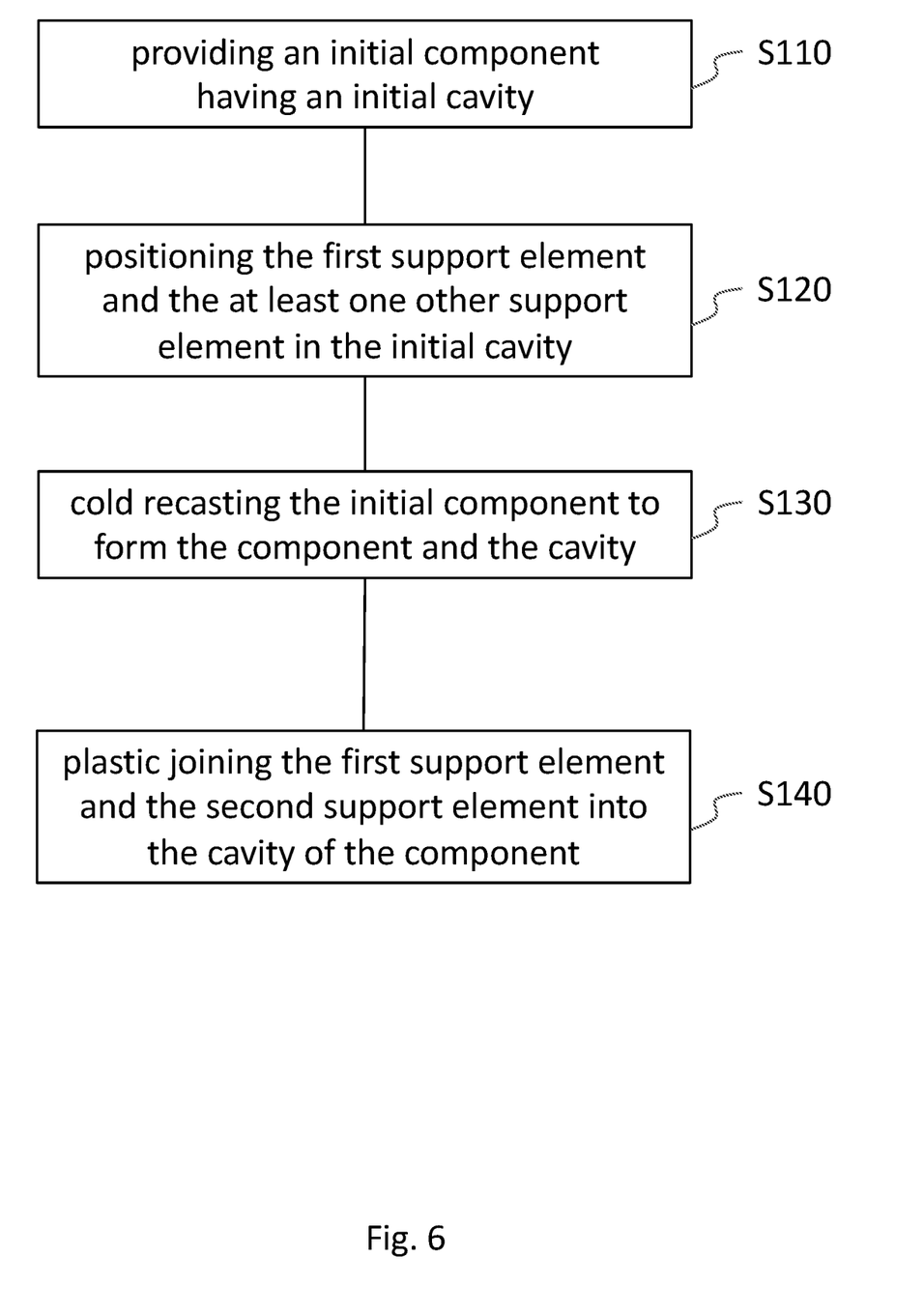
FIG. 6 shows steps of a process for manufacturing a component with integrated sensor device.

FIG. 6 shows steps of a method for manufacturing a component 100 with an integrated sensor device 200 for an optical, multi-axial measurement of a force action on the component 100. The component 100 includes a cavity 110, a first supporting element 210 with first optical elements 220 and at least one further supporting element 230 with further optical elements 240, wherein a hardness of the first supporting element 210 and of the at least one further supporting element 230 is greater than a hardness of the component 100. In particular, the supporting elements 210, 230 may each comprise a hard region and a soft or more easily deformable region. For example, a support element having a core and an edge that is more easily deformable than the core may be used. A step of the method includes providing S110 an initial component having an initial cavity. A further step includes positioning S120 the first support element 210 and the at least one further support element 230 into the initial cavity. A further step then includes recasting S130 the initial component so as to form the component and the cavity. In particular, the recasting S130 may include cold recasting, for example, round pressing for a cylindrical component 100, or cold solid recasting. The recasting S130 of the structure also forms the cavity 110. The recasting S130 also causes a plastic joining S140 of the first support element 210 as well as the second support element 230 into the cavity 110 of the component 100.

Figure 7:
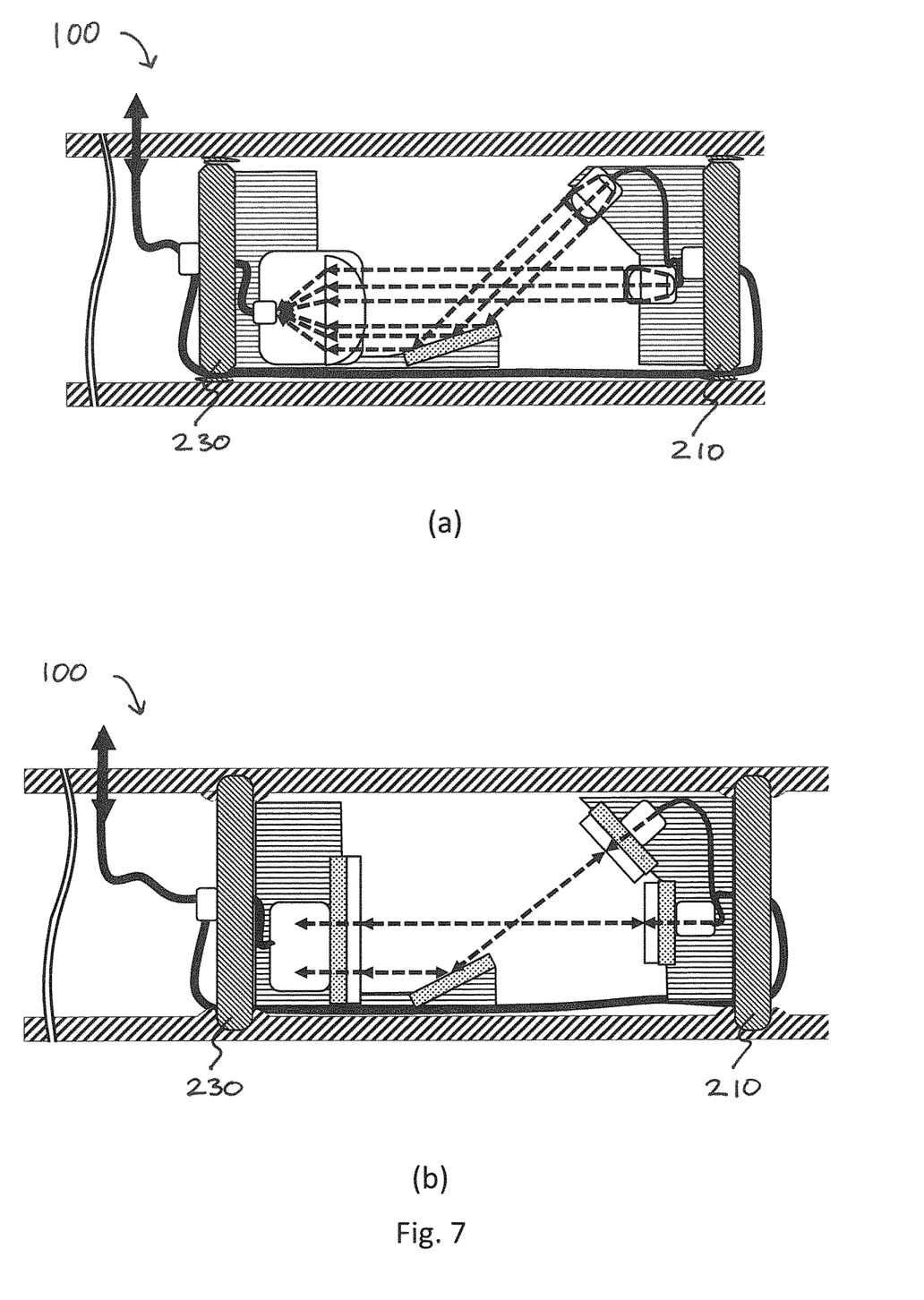
FIG. 7 illustrates further results of embodiments of the method according to FIG. 6.

FIG. 7 illustrates further results of embodiments of the method of FIG. 6. In a part (a) of the figure, an embodiment with a sensor device 200 similar to FIG. 1 is shown. In this result of a first embodiment of the method, the support elements 210, 230 comprise a core of very hard material and a peripheral region comprising a more easily deformable material compared to the material of the core. The more easily deformable material has been plastically deformed by recasting S130 the component 100 so that the support elements 210, 230 have been fixed in the resulting cavity 110.

In a part (b) of the figure, an embodiment with a sensor device 200 similar to FIG. 2 is shown. In this result of a second embodiment of the method, the supporting elements 210, 230 comprise a very hard material compared to a material of the component 100, so that during recasting S130 the material of the component 100 has been plastically deformed by the hard material supporting elements 210, 230. In this way, the supporting elements 210, 230 have been fixed in the cavity 110 of the component 100 formed by recasting S130.

The features of the invention disclosed in the description, the claims and the figures may be essential to the realization of the invention either individually or in any combination. Sizes, displacements and angles in the figures are merely exemplary.

LIST OF REFERENCE SIGNS 100 component
110 cavity
120 wall thickness
200 sensor device
210 first supporting element
220 first optical elements
221 beam expander element
222 optical mask
225 mirror of the first optical elements
227 partially reflective plate of the first optical elements
230 second support element
240 second optical elements
243 beam collection element
245 mirror of the second optical elements
247 partially reflective plate of the second optical elements
249 interference element
300 transmission device
320 line
331 first beam
332 second beam
410 image of the optical pattern in the first beam
411, 412, 413 first calculation points
420 image of the optical pattern in the second beam
421, 422, 423 second calculation points
430 pivot point
440, 450, 460 Moiré pattern
$v_x$, $v_y$, $v'_y$, $\Delta x$, $\Delta y$, $\Delta y'$ displacements
$\alpha$, $\varphi$ angle
F force
M torque

The invention claimed is:

1. A component with an integrated sensor device for an optical, multi-axial measurement of a force application on the component, the component comprising:
a cavity;
a first support element having one or more first optical elements and a second support element having one or more second optical elements, the first support element and the second support element being formed in the cavity and being partially inserted into the component; and
a transmission device, which is configured,
to be connected to a power source and
to transmit, when connected to the power source, at least two beams in independent directions, the beams passing through the cavity between the first optical elements and the second optical elements, respectively,
wherein the first optical elements and the second optical elements are adapted to generate information about a relative position change of the first support element with respect to the second support element based on the at least two beams,
wherein the second optical elements include a mirror arranged in a second beam of the at least two beams,
wherein the mirror deflects the second beam between a parallel part that extends parallel to a longitudinal axis of the component and an inclined part that is inclined relative to the longitudinal axis of the component, and
wherein the transmission device is adapted to provide the information for measuring the force application.

2. The component according to claim 1,
wherein the power source is a light source and the transmission device is configured for transmission of transmitting the information from the component through a light guide.

3. The component according to claim 1, wherein the component is any one of the following:
a hollow shaft,
a hollow cylindrical component,
a pipe,
a robot element,
an element intended for a structure,
a crane arm, a connecting element,
a column of a machine tool,
a tool,
a tool holder.

4. The component according to claim 1, wherein the first optical elements or the second optical elements comprise an optical pattern and are configured to superimpose the at least two beams such that the information includes a change to a detected optical image of said pattern.

5. The component according to claim 1, wherein the first optical elements and the second optical elements form a Michelson interferometer and the information is based on a Michelson interference pattern.

6. The component according to claim 1, wherein at least one of the first optical elements and at least one of the second optical elements each comprise a partially reflective plate and are configured to form a Fabry-Pérot interferometer for at least one of the at least two beams.

7. The component according to claim 1, wherein at least one further support element comprising one or more further optical elements is formed in the cavity and is partially inserted into the component.

8. The component according to claim 1,
wherein the power source is a current source and the transmission device is configured for transmitting the information from the component through an electrical line.

9. The component according to claim 1,
wherein the first optical elements include two beam expanding elements configured to expand light supplied by the power source via a light guide to generate the at least two beams.

10. The component according to claim 1,
wherein the second optical elements comprise a beam collecting element configured to the at least two beams and propagate the at least two beams as a light signal through a fiber optic cable.

11. The component according to claim 1,
wherein the first optical elements include light emitting diodes, and
wherein the second optical elements comprises a camera.

12. A method for manufacturing a component with an integrated sensor device for an optical, multi-axial measurement of a force application on the component, the component including a cavity, the method comprising:
providing an initial component having an initial cavity;
providing a first support element having one or more first optical elements and at least one further support element having one or more further optical elements;
providing a transmission device, which is configured,
to be connected to a power source and
to transmit, when connected to the power source, at least two beams in independent directions, the beams passing through the cavity between the first optical elements and the further optical elements, respectively;
positioning the first support element and the at least one further support element in the initial cavity;
cold solid recasting the initial component so as to form the component and the cavity; thereby
plastically joining the first support element and the at least one further support element so as to fix the first support element and the at least one further support element in the cavity,
wherein the further optical elements include a mirror arranged in a second beam of the at least two beams,
wherein the mirror deflects the second beam between a parallel part that extends parallel to a longitudinal axis of the component and an inclined part that is inclined relative to the longitudinal axis of the component.

13. The component according to claim 9, further comprising an optical mask arranged at the two beam expanding elements.

* * * * *